United States Patent
Kuta et al.

[11] Patent Number: 6,025,967
[45] Date of Patent: Feb. 15, 2000

[54] METHOD OF IDENTIFYING MAGNETIC TAPE CHARACTERISTICS

[75] Inventors: Leroy Kuta, Mahtomedi; Robert Youngquist, White Bear Lake, both of Minn.; Michael Kelly, Erin Prairie Township, St. Croix County, Wis.

[73] Assignee: Imation Corp., Oakdale, Minn.

[21] Appl. No.: 08/111,176

[22] Filed: Aug. 24, 1993

[51] Int. Cl.[7] .............................................. G11B 15/087
[52] U.S. Cl. ........................ 360/69; 360/72.2; 360/77.13
[58] Field of Search ................................. 360/72.1, 72.2, 360/132, 134

[56] References Cited

U.S. PATENT DOCUMENTS

| | | |
|---|---|---|
| 2,514,578 | 7/1950 | Heller et al. . |
| 2,535,497 | 12/1950 | Jones . |
| 2,697,754 | 12/1954 | Ranger . |
| 2,757,242 | 7/1956 | Ranger . |
| 2,803,988 | 8/1957 | Ranger . |
| 2,876,295 | 3/1959 | Irby ...................................... 360/107 X |
| 2,986,609 | 5/1961 | Hoshino et al. ..................... 360/107 X |
| 3,539,734 | 11/1970 | Tsuchiya . |
| 3,587,180 | 6/1971 | Richt . |
| 3,861,619 | 1/1975 | Wolff . |
| 3,958,272 | 5/1976 | Rotter et al. . |
| 3,961,368 | 6/1976 | Herbst et al. . |
| 4,007,491 | 2/1977 | Bolick, Jr. et al. . |
| 4,110,800 | 8/1978 | Rotter et al. . |
| 4,157,576 | 6/1979 | Hack et al. ......................... 360/107 X |
| 4,313,140 | 1/1982 | Keidl . |
| 4,422,111 | 12/1983 | Moeller et al. ....................... 360/72.1 |
| 4,435,735 | 3/1984 | Furuta . |
| 4,611,249 | 9/1986 | McClure ............................. 360/77.12 |
| 4,652,945 | 3/1987 | Marchant . |
| 4,802,030 | 1/1989 | Henry et al. .......................... 360/75 X |
| 4,835,628 | 5/1989 | Hinz et al. . |
| 5,057,950 | 10/1991 | Ozaki et al. . |
| 5,070,419 | 12/1991 | Kiyonaga . |
| 5,073,834 | 12/1991 | Best et al. . |
| 5,081,548 | 1/1992 | Inazawa et al. . |
| 5,091,805 | 2/1992 | Odaka et al. . |
| 5,117,313 | 5/1992 | Lokhoff et al. ........................... 360/40 |
| 5,132,861 | 7/1992 | Behr et al. ........................ 360/77.12 X |
| 5,194,997 | 3/1993 | Kozuki et al. . |
| 5,327,305 | 2/1990 | Thomas et al. ..................... 360/72.1 X |
| 5,363,251 | 11/1994 | Kamo et al. ............................... 360/55 |

FOREIGN PATENT DOCUMENTS

| | | |
|---|---|---|
| 796 192 | 7/1973 | Belgium . |
| 0 014 311 A1 | 8/1980 | European Pat. Off. . |
| 58-114303 | 7/1983 | Japan .................................. 360/77.12 |
| 1-169716 | 7/1989 | Japan .................................... 360/75 C |
| 3-30103 | 2/1991 | Japan . |
| WO 90/12393 | 10/1990 | WIPO . |

OTHER PUBLICATIONS

English translation of JP58–114303, Akiyama et al., Magnetic Recording Method, Jul. 1983.

"Multitrack Transducer with Track Selectivity," Hyland et al., *IBM Technical Disclosure Bulletin,* vol. 15, No. 6, Nov. 1972, p. 1886.

*Primary Examiner*—Aristotelis M. Psitos
*Assistant Examiner*—James L. Habermehl
*Attorney, Agent, or Firm*—Eric D. Levinson

[57] ABSTRACT

A method for providing information about the characteristics of a length of magnetic tape to a tape drive without the use of a separate sensor. The drive has a scanning read/write head that is capable of reading/writing on data tracks on the tape which span at least a portion of the width of the tape. A pattern of magnetically polarized stripes is provided on the tape. The stripes extend along the length of a portion of the tape and are polarized substantially transversely to their length. As the tape is driven past a read/write head, the head reads the pattern on the tape, and decodes the information in the pattern. The drive can then respond as appropriate to the information to facilitate the reading/writing of data on the tape.

20 Claims, 6 Drawing Sheets

METHOD OF IDENTIFYING MAGNETIC TAPE CHARACTERISTICS

FIELD OF THE INVENTION

The present invention relates generally to magnetic recording and more particularly to methods of providing information to a tape drive about the characteristics of a magnetic recording tape.

BACKGROUND OF THE INVENTION

The use of magnetic recording tape to store information is well known. One method of recording on such tape is to provide a read/write head that rotates rapidly as the tape is passed by it, thereby providing data track which span a portion of the width of the tape. Examples of such data tracks include helical and arcuate data tracks.

It is often desirable to be able to provide instructions on a magnetic tape that will inform a magnetic tape drive about the characteristics of a tape that has been loaded in the drive. For example, the instructions could indicate the recording density of the tape, thereby allowing the drive to properly read and/or write on the tape. The instructions could also indicate when the drive has reached the end of the tape, thereby signaling the drive to reverse the direction that it moves the tape.

Various methods have been used to provide such information on the tape. One method involves providing one or more holes near the ends of the tape. This method can be disadvantageous because it may require the use of a separate sensor to sense the holes. Another disadvantage of this method is that the holes weaken the tape, thereby increasing the likelihood that the tape will be stretched or torn in the portions around the holes. The holes can also create "print-through", which occurs when tape is wrapped around the tape hub and additional layers of tape are pressed over the holes, causing the holes to create indentations in the additional layers of tape, which may impair the read/write process. Furthermore, in current implementations of this method, the method of detecting the presence of the holes can be unreliable.

SUMMARY OF THE INVENTION

Accordingly, the present invention provides a reliable method for providing information about the characteristics of a length of magnetic tape to a tape drive without the use of a separate sensor, where the drive has a read/write head that is capable of reading/writing data on tracks provided on the tape which span at least a portion of the width of the tape. A pattern of magnetically polarized stripes is provided on the tape. The stripes are parallel to the length of the tape and are polarized substantially transverse to their length. As the tape is driven past a read/write head, the head reads the pattern on the tape, and decodes the information in the pattern. The drive can then respond as appropriate to the information to facilitate the reading/writing of data on the tape. Preferably, the pattern is recorded in the tape to a depth sufficient to ensure that data tracks can be recorded over the pattern without significantly altering the magnetic properties of the pattern.

In one embodiment, the present invention includes a method of indicating when the drive has reached the end of a magnetic tape. A magnetically polarized stripe or pattern of stripes is provided at both ends of the tape. One or more patterns may also be provided along the length of the tape to indicate to the drive which portion of the tape is passing by the head.

In another embodiment, the present invention includes a method of indicating the type of magnetic tape being loaded into the drive, such as the tape length, media type, recording density, format, etc. The drive then read/writes the tape in accordance with the tape type information.

In yet another embodiment, the present invention includes a method of transversely centering the head with respect to the tape. A magnetically polarized stripe is provided along a length of the tape. The method involves determining the rotational position of the head as it passes over the stripe and comparing that position with a known rotational position of the head when it is centered on the tape. The head is then moved with respect to the tape to center the head. In an alternative embodiment, a second stripe, parallel to the first, can be provided along the same portion of the length of the tape. The rotational position of the head as it passes over each stripe is then compared with the known rotational positions of the head when it is centered on the tape.

As used herein, the term "read/write" means read and/or write.

DETAILED DESCRIPTION

Figure 1:
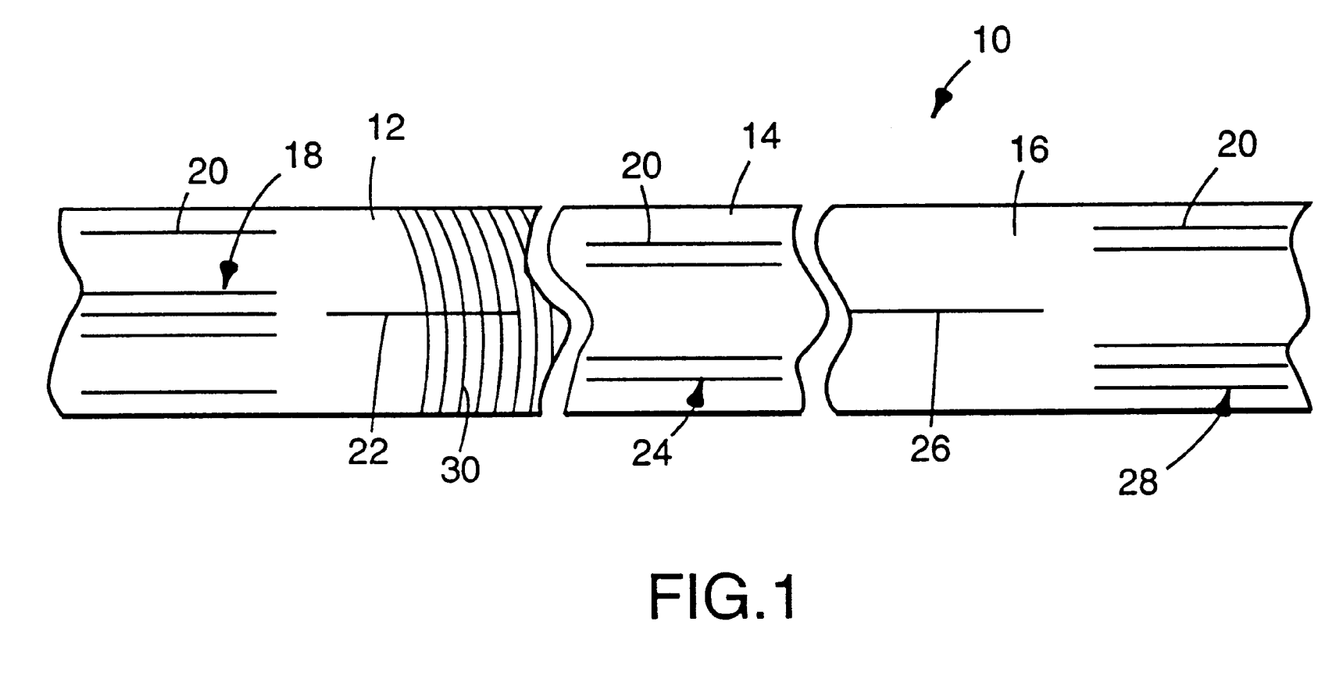
FIG. 1 shows a strip of magnetic tape for use with the method of the present invention.

A strip of magnetic recording tape having magnetically recorded stripes is shown in FIG. 1. Magnetic recording tape 10 is comprised of beginning portion 12, middle portion 14, and end portion 16. Beginning portion 12 has a pattern 18 of magnetically polarized stripes 20 provided at the beginning of the beginning portion. Stripes 20 in pattern 18 are parallel to each other and parallel to the length (longitude) of tape 10. Stripes 20 are polarized in it he plane of tape 10 in the direction substantially perpendicular to the length of the tape.

A stripe 22 is identical to any of stripes 20. Stripe 22 is positioned on beginning portion 12 of tape 10 on the side of pattern 18 nearer the middle of the length of tape. Stripe 22 may be placed along the centerline of tape 10.

Middle portion 14 of tape 10 has a pattern 24 of magnetically polarized stripes 20. Pattern 24 can be any of a number of different patterns, but is preferably not identical to pattern 18. Pattern 24 can be placed at the exact mid-point of the length of tape 10, or it can be placed at another location along the length of the tape. Additional patterns (not shown) can be provided along the length of tape 10 between beginning portion 12 and end portion 16.

End portion 16 has a pattern 28 of stripes 20. Pattern 28 can be any of a number of different patterns, but is preferably not identical to patterns 18 and 24. A stripe 26 is identical to any of stripes 20. Stripe 26 is positioned on end portion 16 of tape 10 on the side of pattern 28 nearer the middle of the length of the tape. Stripe 26 may be placed along the centerline of tape 10.

Data tracks 30 span at least a portion of the width of tape 10, and can be helical tracks, or arcuate tracks as shown in FIG. 1. Data tracks 30 are preferably substantially perpendicular to polarized stripes 20. Although not shown in FIG. 1, data tracks 30 can optionally extend along the entire length of tape 10.

The curvature of data tracks 30 and the spacing between them is exaggerated in FIG. 1 for the purpose of illustration. As an arcuate scanning head (not shown) moves across the width of tape 10, the radius of curvature of its path would be symmetric about the center line of the tape except for the fact that the tape is moving longitudinally as the scanning head is passing over the tape. This effect is also exaggerated in FIG. 1. Stripes 20 are preferably recorded in tape 10 to a depth sufficient to ensure that data tracks 30 may be recorded over the stripes without significantly altering the magnetic properties of the stripes.

Figure 2:
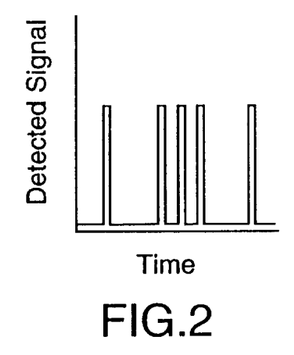
FIG. 2 shows a graph of the detected signal versus time for a transverse scanning head according to the present invention as it passes over a portion of the tape of FIG. 1.

As a transverse scanning head (e.g., helical or arcuate) passes magnetically polarized stripes 20, the magnetic head senses the presence or absence of the stripes. The signals generated by the transverse scanning head as it passes over stripes 20 can be graphed as a function of time. Each such graph would differ depending upon the pattern of stripes 20 provided. For example, the graph for pattern 18 of stripes 20 on beginning portion 12 is shown in FIG. 2. As the magnetic head passes over the width of tape 10 along data tracks 30, it passes over the first stripe 20, then over the middle three stripes, and then over the last stripe. Thus, the spacing of the detected signals shown in FIG. 2 corresponds to the spacing of stripes 20 in pattern 18.

Figure 3A:
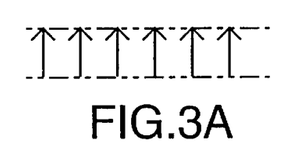
FIGS. 3A–3C show alternative magnetizations for the magnetically polarized stripes of FIG. 1.
Figure 4A:
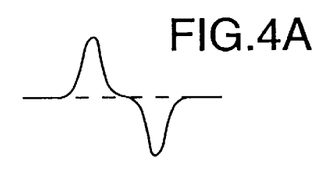
FIGS. 4A–4C show the amplitudes of the signal generated as the traverse scanning head passes over the stripes of FIGS. 3A–3C, respectively.

Each magnetically polarized stripe 20 can be comprised of a single magnetically written signal having north and south poles on either side of the signal centerline, as shown in FIG. 3A. As the transverse scanning head passes across the magnetically written signal, it generates a signal resembling the signal shown in FIG. 4A.

Figure 3B:
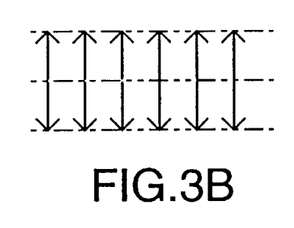
Figure 4B:
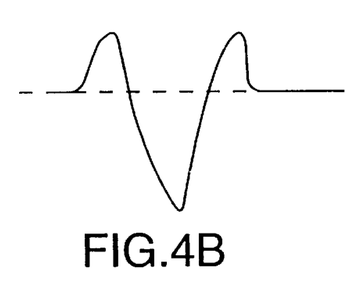

In the alternative, stripe 20 can be comprised of two magnetically written signals having north and south poles on each side of the centerline of the two signals, wherein the two signals are aligned so that the direction of polarization of each signal is reversed with respect to the other signal, as shown in FIG. 3B. A profile of the signal is shown in FIG. 4B.

Figure 3C:
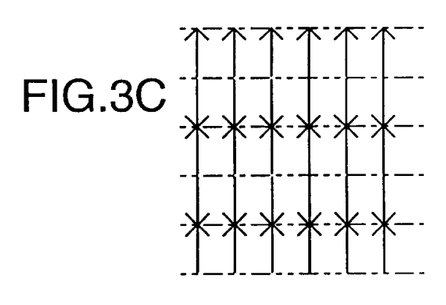
Figure 4C:
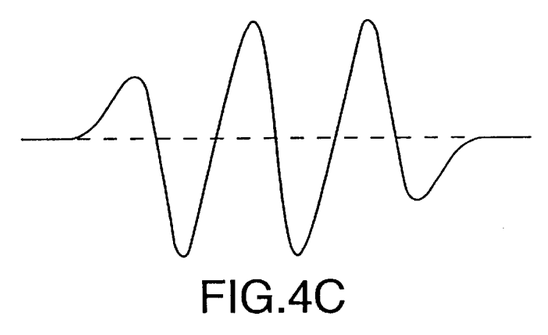

Furthermore, each stripe 20 can be comprised of further adjacent magnetically written signals, as shown in FIG. 3C. This increases the number of cycles of the signal generated in FIG. 2. A profile of the signal is shown in FIG. 4C.

The patterns of stripes 20 can be selected to provide information about the characteristics of tape 10 to a magnetic tape drive (not shown). The drive would have to be programmed to recognize a particular pattern as representing a particular tape characteristic. The pattern should be long enough to provide for the transverse scanning head to pass over it several times thereby ensuring that the pattern will be properly recognized by the drive. The pattern of stripes 20 is preferably recorded to a depth sufficient to ensure that data tracks 30 may be recorded over the stripes without significantly altering the magnetic properties of the stripes.

According to one method of the present invention, a pattern of stripes 20 can be used to provide information to the drive about the type of tape 10 being used, such as tape length, media type, recording density, format, etc. According to another method of the present invention, a pattern of stripes 20 could also be provided at one end of the length of tape 10 to indicate that the magnetic tape drive has reached the end of the tape. A second pattern of stripes 20 could be provided at the other end of tape 10 to indicate that the drive has reached the second end of the tape. A pattern of stripes 20 could also be used for indexing to indicate to the drive which portion of the length of tape is passing by the transverse scanning head. One such pattern could be provided at the mid-point of the tape, and/or several additional patterns could be provided along the length of the tape.

Figure 5A:
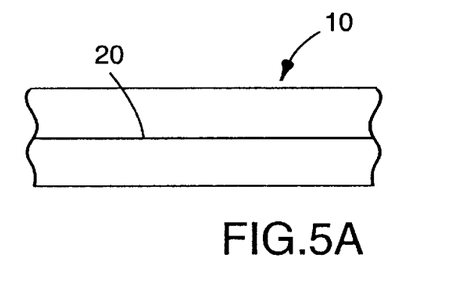
FIGS. 5A–5B show alternative configurations of magnetically polarized stripes on the tape of FIG. 1 to provide centering according to the present invention.

One or more stripes 20 could also be used in a method according to the present invention for centering a transverse scanning head with respect to tape 10. For example, one longitudinal stripe 20 could be provided in the middle of the width of tape 10, as shown in FIG. 5A. In the alternative, two stripes 20 could be used, each an equal distance from the edge of tape 10, as shown in FIG. 5B.

Figure 6A:
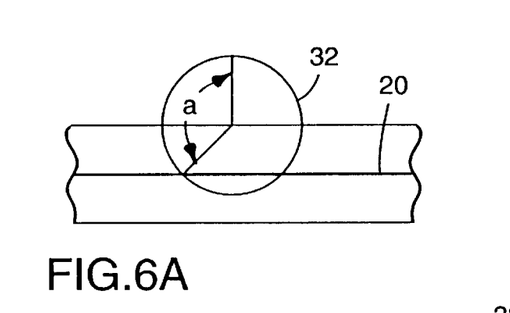
FIGS. 6A–6C show various insert timing angles which are generated by the stripe of FIG. 5A when a transverse scanning head passes over a magnetically polarized stripe according to the present invention.
Figure 6B:
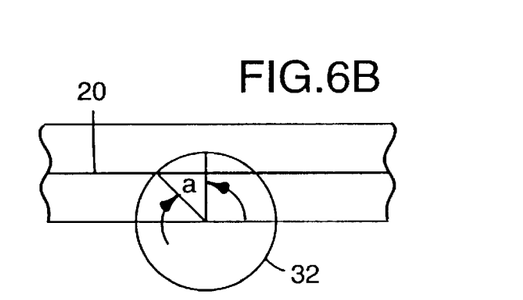
Figure 6C:
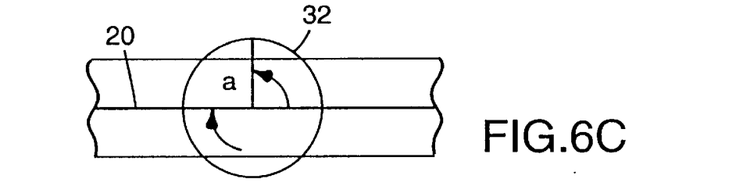

A method according to the present invention for centering a transverse scanning head over magnetic tape 10 is illustrated in FIGS. 6A–6C. If the scanning head is an arcuate scanner, the arcuate scanner motor has a position transducer which monitors the angular position of each transducer on the drum. By comparing the actual angle (rotation position) of the scanner when the read head detects stripe 20 in FIGS. 5A to the desired angle when the center of the scanner arc is centered on tape 10, the direction to move the scanner to properly center it can be determined.

If the scanner center is located above center stripe 20, position angle a of drum path 32 will be greater than angle a when the scanner center is located over the center stripe as illustrated in FIGS. 6A and 6C. Likewise, if the scanner center is located below center stripe 20, position angle a of drum path 32 will be less than angle a when the scanner center is located over the center stripe, as illustrated in FIGS. 6B and 6C.

Figure 5B:
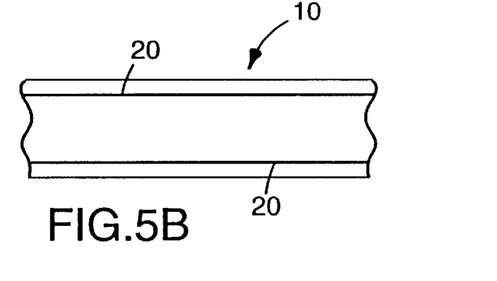

A similar comparison can be performed using tape 10 shown in FIG. 5B by using one or both edge stripes 20 to center the scanning arc on the tape. One advantage of using the stripe configuration of FIG. 5B over FIG. 5A is that the configuration of FIG. 5B can be used to adjust the write timing so that data written on tape 10 will always fit on the recorded arc. By pre-measuring the time it takes a read head to pass from first stripe 20 to the second stripe, and comparing that time to the known desired time, an error signal can be generated to change the write clock or rotational speed of the scanner drum. This will adjust either the write time or the rotational time so that the correct amount of data will fit on the tape.

In order for the drive to sense the pattern of stripes 20, the drive must have a filtering system for separating the signal generated from the pattern of stripes from the signal resulting from reading/writing data on data tracks 30. Stripes 20 are recorded to full media depth by a direct current to create a low frequency signal when read by a transverse read head. Data tracks 30 are recorded at limited depth and have a short wavelength signal. Thus, circuitry must be provided to extract the low frequency pattern from the short wavelength data so that the presence of the pattern can be readily detected.

The system should be highly redundant to ensure that the pattern is not missed or incorrectly interpreted. This may be accomplished bit providing the pattern along a 1 foot (30.5 cm) length of tape. If each data track 30 has a center-to-center spacing of 0.0005 inches (13 $\mu$m), then a one foot (30.5 cm) length of tape provides an opportunity for 24,000 separate readings of the signal. The signal is also detectable at any tape speed because the stripe is uniformly transversely magnetized over the length of the stripe. The signal amplitude does not significantly vary with linear tape speed, and can be detected even if the linear motion of the tape is stopped.

Figure 7:
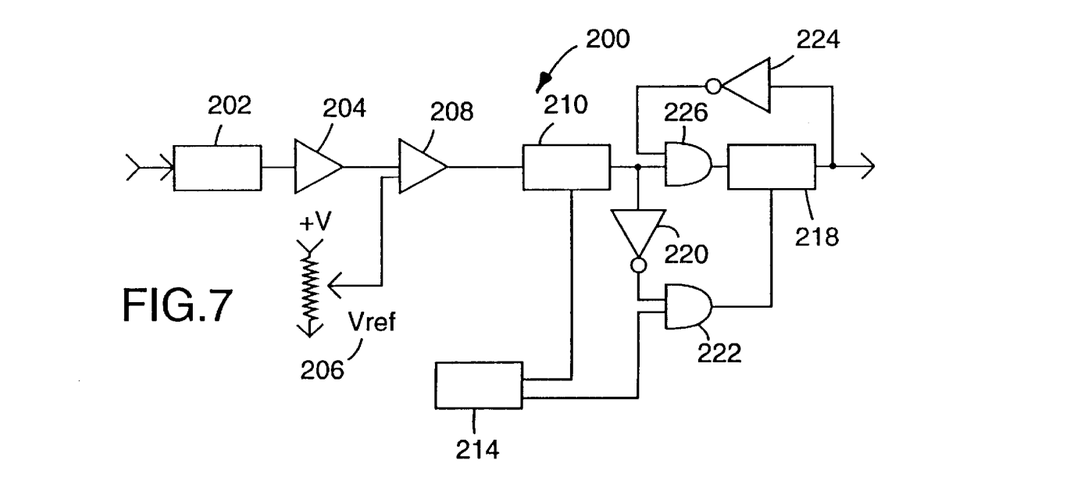
FIG. 7 is a schematic diagram showing how the signals from the pattern can be separated from the signals from the data tracks.

A possible detection system 200 for detecting a single stripe 20 is shown in FIG. 7. Detection system 200 consists of a filter system that removes data and noise from the composite signal of the pattern overwritten by formatted data. Next, an amplitude qualification step is performed to accept only signals that are larger than a reference level. This output is then further qualified by checking for the known repetitive characteristics of the signal to further eliminate false or borderline inputs that might be misinterpreted as a valid pattern signal, such as drop-outs and interference. A media position or timing window could also be part of this qualification.

The entire composite read signal that includes the low frequency pattern and the data signal is filtered to remove the data frequency components. The filter system 202 may be a simple low pass filter if the pattern is comprised of only one stripe 20, or a narrow bandpass filter, rectifier and low pass filter if the pattern is comprised of a series of equally spaced longitudinally recorded transverse signals that when scanned transversely, generate a low frequency of a limited number of cycles, such as is shown in FIG. 4D. It is then amplified by amplifier 204 and compared to a voltage reference 206. When the signal exceed the reference voltage 206, a logic level true is generated by an amplitude comparator 208 which sets a conventional set/reset flip-flop 210. Flip-flop 210 is reset by a start gate pulse that is generated at the beginning of the read head scan across the tape by timing circuit 214. Thus, flip-flop 210 is set whenever a transverse signal is detected during a read window (gate) set by timing circuit 214. The read window may be the entire width across the tape or a series of smaller windows, such as for detecting transverse signals in bands across the tape. The read windows are derived from the angular position encoder on the scanning head/drum motor.

If flip-flop 210 is set sometime during the read window, the flip-flop increments a counter 218. Counter 218 is reset at the end of the read window if a transverse signal is not detected during the window by an inverter 220 and AND gate 222.

After a predetermined number of consecutive transverse signals are detected in adjacent scans, counter 218 counts up to its maximum count value (for instance 4) and is prevented from counting higher by a feedback counter limiter consisting of inverter 224 and AND gate 226. The valid signal goes true when the predetermined number of transverse signals on consecutive scans is detected. Counter 218 is reset if a transverse signal is not detected in a scan and the qualifying count process starts over.

This qualifying method may be implemented in actual logic circuits as shown in FIG. 7 and described herein or in microprocessor firmware code if the microprocessor is supplied with the amplitude comparator output and the read window timing signals.

The patterns of magnetically polarized stripes 20 describe herein can be used to provide information about the characteristics of a length of magnetic tape 10 to a magnetic tape drive. The tape drive should have a read/write head capable of reading/writing on the transverse data tracks 30. First, a length of magnetic tape 10 is provided in a magnetic recording drive. Tape 10 may be provided in a cartridge (not shown). Next, tape 10 is driven past the transverse scanning read/write head, which senses the pattern on the tape. The pattern is then separated from the signal (if any) generated from reading/writing the data tracks. The resultant low frequency signal is then compared with reference, signals stored in the memory of the drive, thereby allowing the drive to decode the information stored in the pattern. The drive then makes adjustments as necessary to respond to the information received.

For example, pattern 28 of stripes 20 could be used to indicate that the transverse scanning head has reached one end of the length of tape 10. Magnetically polarized stripe 26 could be used as a warning signal to the drive. As the transverse scanning head begins to pass over warning stripe 26, the drive senses the stripe and finishes recording the data stored in its memory, which is recorded on either side of the stripe. When the transverse scanning head crosses over pattern 28, the drive recognizes that it has reached the first end of tape 10. The direction of travel of tape 10 could then be reversed, or the tape could be exited from the drive, as appropriate.

Similarly, pattern 18 could be used to indicate that the transverse scanning head has reached the opposite end of the length of tape 10. Magnetically polarized warning stripe 22 could be used as a warning signal to the drive, as described above. Pattern 18 and warning stripe 22 would perform the same function as pattern 28 and warning stripe 26, except for the other end of tape 10. Preferably, pattern 18 would differ from pattern 28 so that the drive would know at which end of tape 10 it was reading/writing on. Pattern 18 and warning stripe 22 could also be used to indicate to the drive the load point of the tape so that the drive can begin writing on the tape.

Pattern 24 could be placed at the mid-point of the length of tape 10, thereby identifying the mid-point of the length of the tape. Additional patterns 24 could be provided used to indicate further locations on the tape, e.g., one-quarter and three-quarter, or one-tenth, two-tenth, etc. Preferably, each pattern 24 would differ from patterns 18 and 28, if present, and would differ from each other, thereby allowing the drive to index to a particular location on the length of tape 10.

Additional patterns, such as patterns 18, 24, and 28, could be used to provide information to the drive about the type of tape being used such as tape length, media type, recording density, format, etc. Warning stripes similar to warning stripes 22 and 26 could be provided on either side of each such pattern of stripes 20 to allow the scanning head to finish recording data before reaching the pattern. Those skilled in the art will recognize that the patterns disclosed herein can be used to provide other kinds of information to the drive.

Although the above description of the invention often refers to the use of a pattern of stripes, those skilled in the art will recognize that in many cases the pattern can be replaced by a single stripe, which could convey additional information based on its position across the width of the tape. For example, a single stripe located in the bottom half of the width of the tape could indicate the beginning of the tape, while a single stripe located in the top half of the tape could indicate the end of the tape.

The manner of making stripes 20 will now be described with reference to FIGS. 8–10. Stripes 20 can be made by recording head 60 shown in FIG. 8. Recording head 60 is comprised of upper housing 62, lower housing 64, and at least one core structure 80 housed within and between the two housings. Upper housing 62 and lower housing 64 have front surfaces 66 and 68, respectively, which face toward tape 10 on which stripes 20 are desired to be recorded.

Lower housing 64 has a plurality of slots 72, each of which is parallel to the length of head 60, extending across the width of front surface 58 of the lower housing. Lower housing 64 also has a plurality of slots 74, each of which is parallel to and corresponds to the first plurality of slots 72, extending across the width of the rear portion of the lower housing. Each pair of slots 72 and 74 is configured to hold one core structure 80. Core structures 80 are contained within housings 62 and 64 except for the tip of each core structure, which may protrude from front surface 68 of the lower housing.

Figure 8:
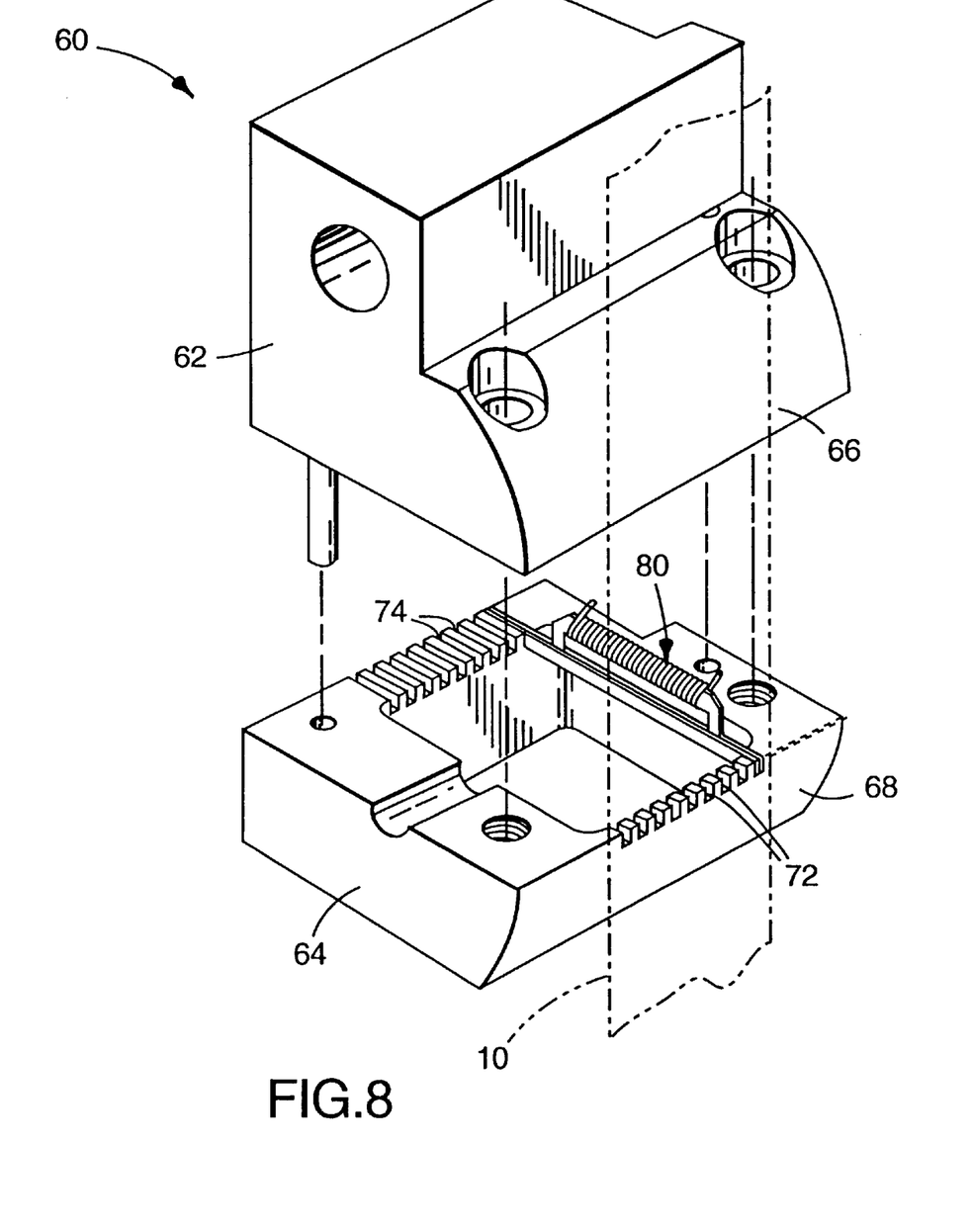
FIG. 8 is an exploded schematic perspective view of a magnetic recording head for creating the magnetically polarized stripes of FIG. 1.

Tape 10 is moved past head 60 as shown in FIG. 8. A plurality of stripes 20 can be recorded on tape 10 by providing a plurality of core structures 80. The spacing of stripes 20 across the width of tape 10 can be easily selected by choosing in which slots 72 and 74 to place them. In the alternative, core structures 80 could be placed in every slot 72 and 74, and each core structure could be wired separately so that external circuitry (not shown) could be used to independently turn on or off any or all of the core structures.

It should be noted that stripes 20 are magnetically polarized substantially transverse to the length of tape 10, not longitudinally polarized as is conventionally done. This is accomplished by core structure 80, as discussed below.

Figure 9:
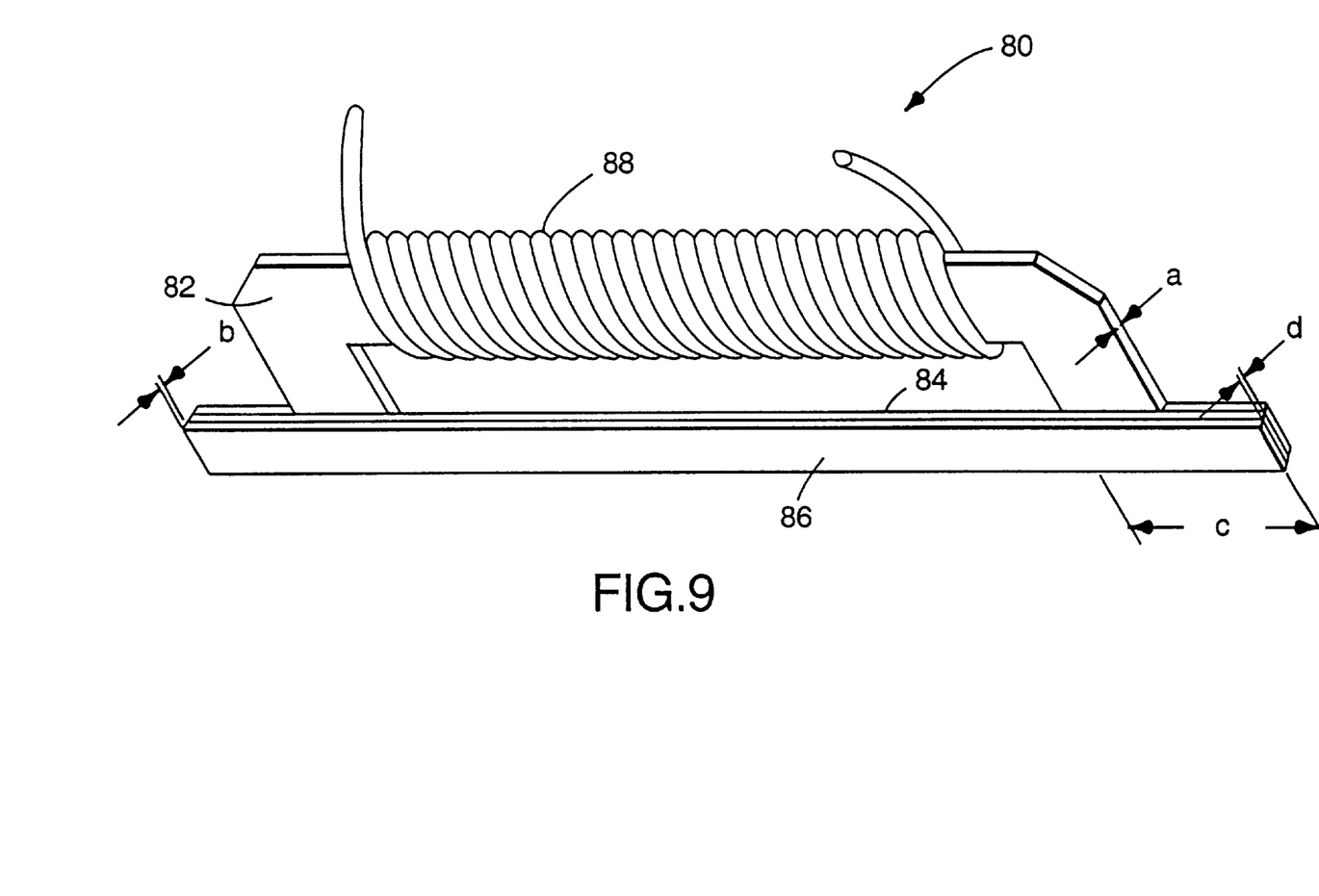
FIG. 9 is a schematic perspective view of the magnetic core structure used in the head of FIG. 8.

Core structure 80 is comprised of C-shaped magnetic conductor or core 82, coil 88 wrapped around the C-shaped core, bar 86, and spacer 84, as shown in FIG. 9. C-shaped core 82 is preferably made of a high magnetic permeability, low coercivity, high magnetic saturation material such as AlFeSil (85% iron 9% silicon, 6% aluminum), or Carpenter High Permeability 49 Alloy (48% nickel, 51.13% iron, 0.35% silicon, 0.50% manganese, and 0.02% carbon), both of which are available from Carpenter Metals Co., Reading, Pa. C-shaped core 82 preferably has a width a of about 150 $\mu$m. Coil 88 can be comprised of 150 turns of copper wire having a diameter of about 50 $\mu$m. Bar 56 is preferably made of the same material as C-shaped core 82 and has a width d of about 150 $\mu$m. Spacer 84 is preferably made from copper or brass and has a width b of from about 19 $\mu$m to 51 $\mu$m. The width d of spacer 84 defines the width of the recording gap of head 60.

The depth of the recording gap of head 60 is defined by the distance c from front surface 68 of lower housing 64 to where C-shaped core 82 no longer overlaps bar 86.

In order to place core structures 80 closely adjacent each other, it may be necessary to alternate core structures which have coils 88 that are above and below slots 72 and 74 in lower housing 64. (This can be most easily pictured by simply turning core structures 80 as shown in FIG. 9 upside down.) This allows core structures 80 to be packed closely together without having their coils 88 interfering with each other.

Figure 10:
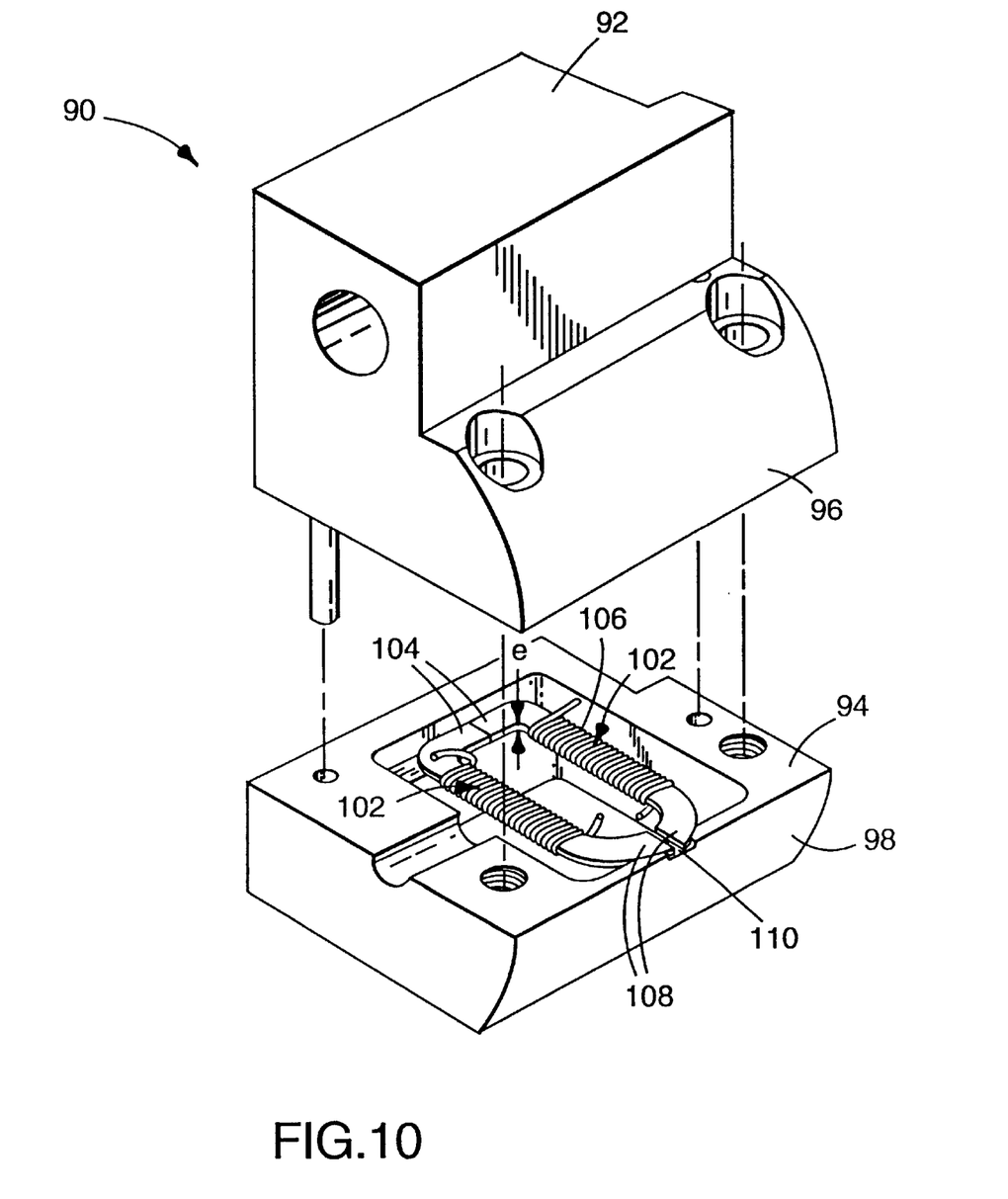
FIG. 10 is an exploded schematic perspective view of another magnetic recording head for creating the magnetically polarized stripes of FIG. 1.

An alternative embodiment of a head for recording stripe 20 is shown in FIG. 10. Recording head 90 is comprised of upper housing 92, lower housing 94, and a pair of core structures 102 housed within and between the two housings. Upper housing 92 and lower housing 94 have front surfaces 96 and 98, respectively, which face toward tape 10 on which stripe 20 is desired to be recorded.

Core structures 102 are comprised of coils 106 wrapped around C-shaped cores 104. Core structures 102 are preferably made of a high magnetic permeability, low coercivity, high magnetic saturation material such as AlFeSil or Carpenter High Permeability 49 Alloy, described above. Coils 106 are preferably comprised of 75 turns of copper wire having a diameter of about 50 $\mu$m on each core structure 102. The two coils 106 should be wired together so that their magnetic fields add.

Core structures 102 are contained within housings 92 and 94 except for the tips 108 of each core structure, which may protrude from front surface 98 of the lower housing. Tips 108 of core structures 102 are separated by spacer 110. Spacer 110 is preferably made from copper or brass and separates tips 108 from each other by from about 19 $\mu$m to 51 $\mu$m. The magnitude of this separation defines the width of the recording gap of head 90.

C-shaped cores 104 each have a width e. However, the width of one C-shaped core 104 can be made larger than the other. If the width of one of the cores 104 is made several times larger than the width of the other core structure, then the magnetic flux concentration at the gap facing edge of the thinner C-shaped core will be several times as great as the flux concentration along the gap facing edge of the wider C-shaped structure. Thus, the field strength can be adjusted so that only a single magnetic path is recorded on tape 10, the path being coincident with the gap facing edge of the thinner core 104.

Another method of making stripe 20 would be to have a second pass by the recording head, in the same direction as the first pass, wherein the head is slightly displaced transversely across the width of tape 10 from the first stripe. This might provide a stripe 20 having improved symmetry and amplitude.

Stripes 20 could be recorded by using a pulsed or continuous magnetic field. In the alternative, a permanent magnet could be used to record a stripe 20, although it is believed that it would be difficult to record multiple stripes on the tape during a single pass of the tape by the magnet.

We claim:

1. A method of providing information about characteristics of a length of magnetic tape to a magnetic tape drive having an arcuate scanning read/write head for reading/writing on arcuate data tracks which are substantially perpendicular to the length of the tape, comprising the steps of:

providing a length of magnetic tape in a magnetic recording drive, wherein the tape includes a pattern containing encoded information, wherein the pattern is positioned on at least one portion of the tape, the pattern comprising a plurality of magnetically polarized stripes parallel to the length of the tape and transversely spaced from each other across the width of the tape, wherein the stripes have a uniform and continuous direction of magnetic polarization in the plane of the tape and substantially perpendicular to the length of the tape, and wherein the pattern is long enough to provide for the arcuate scanning head to pass over the pattern several times;

passing the tape by the arcuate scanning read/write;

reading the pattern on the tape; and using the magnetic tape drive to decode the information in the pattern.

2. The method of claim 1, wherein the pattern is recorded in the tape to a depth sufficient to ensure that arcuate data tracks may be recorded over the pattern without significantly altering the magnetic properties of the pattern.

3. The method of claim 1, wherein the tape further includes a second pattern positioned thereon, the second pattern being long enough to provide for the arcuate scanning head to pass over it several times, wherein the two patterns are positioned at opposite ends of the tape.

4. The method of claim 1, wherein the pattern contains information about the type of the tape, further including the step of reading/writing data on arcuate tracks on the tape in accordance with the tape type information.

5. The method of claim 1, further comprising the steps of measuring the rotational position of the head as it passes over at least one of the stripes in the pattern, comparing the at least one measured position with at least one known measured position when the head is centered on the tape, and moving the head with respect to the tape to center the head on the tape.

6. The method of claim 1, wherein the pattern is provided at a known position on the tape, and further including the step of using the pattern as a means to identify the lengthwise position of the tape in the drive.

7. A method of indicating the end of a magnetic tape in a magnetic recording drive employing an arcuate scanning read/write head for reading/writing on arcuate data tracks which are substantially perpendicular to the length of the tape, comprising the steps of:

provic a length of magnetic tape in a magnetic recording drive, wherein the tape includes a first magnetically polarized stripe parallel to the length of the tape at at least one end of the tape, wherein the stripe has a uniform and continuous direction of magnetic polarization in the plane of the tape and substantially perpendicular to the length of the tape, and wherein the first stripe is long enough to provide for the arcuate scanning head to pass over the first stripe several times;

passing the tape by the arcuate scanning read/write head; and using the may tape drive to read the stripe at the end of the tape, thereby indicating the end of the tape to the magnetic drive.

8. The method of claim 7, further including a second stripe at the other end of the tape, wherein the second stripe is long enough to provide for the arcuate scanning head to pass over the second stripe several times, and further including the step of reading the second stripe at the other end of the tape.

9. The method of claim 7, further including at least a second magnetically polarized stripe at said at least one end of the tape having a uniform and continuous direction of polarization in the plane of the tape and substantially perpendicular to the length of the tape, the second stripe being parallel to the first stripe and spaced transversely from the first stripe across the width of the tape, wherein the second stripe is long enough to provide for the arcuate scanning head to pass over the second stripe several times, thereby forming a first pattern of stripes, the pattern containing encoded information, wherein the step of reading the stripe includes reading the first pattern of stripes and decoding the information in the first pattern.

10. The method of claim 9, further including a second pattern of magnetically polarized stripes positioned at the other end of the tape, wherein the second pattern of stripes is long enough to provide for the arcuate scanning head to pass over the second pattern several times, and further including the step of reading the second pattern and decoding the information in the second pattern.

11. The method of claim 10, wherein the patterns are recorded in the tape to a depth sufficient to ensure that the arcuate data tracks may be recorded over the patterns without significantly altering the magnetic properties of the patterns.

12. A method of providing information about magnetic tape in a magnetic recording drive employing an arcuate scanning read/write head for reading/writing on arcuate data tracks which are substantially perpendicular to the length of the tape, comprising the steps of:

providing a length of magnetic tape in a magnetic recording drive, wherein the tape includes a pattern containing information about the type of the magnetic tape, the pattern comprising a plurality of magnetically polarized stripes parallel to the length of the tape and spaced transversely from each other across the width of the tape, wherein the stripes have a uniform and continuous direction of magnetic polarization in the plane of the tape and substantially perpendicular to the length of the tape, and wherein the stripes are long enough to provide for the arcuate scanning head to pass over the stripes several times;

passing the tape by the arcuate scanning read/write head, thereby reading the pattern;

decoding the magnetic tape type information in the pattern; and reading/writing on the tape in accordance with the tape type information.

13. The method of claim 12, wherein the pattern is recorded in the tape to a depth sufficient to ensure that arcuate data tracks may be recorded over the pattern without significantly altering the magnetic properties of the pattern.

14. A method of transversely centering an arcuate scanning read/write head with respect to a length of magnetic tape in a magnetic recording drive, wherein the head is capable of reading/writing on arcuate data tracks which are substantially perpendicular to the length of the tape, comprising the steps of:

providing the length of magnetic tape in a magnetic recording drive, the tape including a first magnetically polarized stripe at a known position along the width of the tape, wherein the stripe is parallel to the length of the tape and is positioned at at least one end of the tape, wherein the stripe has a uniform and continuous direction of magnetic polarization in the plane of the tape and substantially perpendicular to the length of the tape, and wherein the stripe is long enough to provide for the arcuate scanning head to pass over the stripe several times;

passing the portion of the tape having the first stripe thereon by the read/write head;

determining the rotational position of the head as it crosses the first stripe;

comparing the rotational position of the head with a known rotational position of the head when it is centered on the tape; and transversely moving the head with respect to the tape to center the head on the tape.

15. The method of claim 14, wherein the first stripe is located at the centerline of the tape.

16. The method of claim 14, further including a second magnetically polarized stripe parallel to the first stripe at a second known location on the tape, wherein the second stripe has a uniform and continuous direction of magnetic polarization in the plane of the tape and substantially perpendicular to the length of the tape, wherein the second stripe is long enough to provide for the arcuate scanning head to pass over the second stripe several times, wherein the step of determining the rotational position of the head as it passes over the first stripe includes determining the rotational position of the head as it passes over the second stripe, wherein the step of comparing the rotational position of the head includes comparing the rotational position of the head as it passes over the first stripe with a first known position of the head and comparing the rotational position of the head as it passes over the second stripe with a second known position of the head, and wherein the step of transversely moving the head is made in response to both measurements.

17. The method of claim 14, wherein the stripe is recorded in the tape to a depth sufficient to ensure that arcuate data tracks may be recorded over the stripe without significantly altering the magnetic properties of the stripe, wherein the step of determining the rotational position of the head as it passes over the stripe includes reading/writing on the arcuate data tracks on the tape.

18. A method of indexing a length of magnetic recording tape to indicate to a magnetic recording drive which portion of the tape is proximate an arcuate scanning read/write head in the drive, wherein the head is capable of reading/writing arcuate data tracks which are substantially perpendicular to the length of the tape, comprising the steps of:

providing a length of magnetic tape in a magnetic recording drive, wherein the tape includes a pattern containing indexing information identifying a portion of the length of the tape, the pattern comprising a plurality of magnetically polarized stripes parallel to the length of the tape and spaced transversely from each other across the width of the tape, wherein the stripes have a uniform and continuous direction of magnetization in the plane of the tape and substantially perpendicular to the length of the tape, and wherein the pattern is long enough to provide for the arcuate scanning head to pass over the pattern several times;

passing the tape by the arcuate scanning read/write head;

decoding the information in the pattern; and identifying which portion of the length of tape is passing by the head.

19. The method of claim 18, wherein the pattern is positioned at the mid-point of the length of the tape.

20. The method of claim 18, further including a plurality of patterns provided on the tape, the patterns each comprising a plurality of magnetically polarized stripes parallel to the length of the tape and spaced transversely from each other across the width of the tape, wherein the stripes have a uniform and continuous direction of magnetization in the plane of the tape and substantially perpendicular to the length of the tape, and wherein the stripes are long enough to provide for the arcuate scanning head to pass over each stripe several times, wherein the patterns are spaced from each other along the length of the tape, and wherein each pattern contains information indicating its position along the length of the tape.

* * * * *

UNITED STATES PATENT AND TRADEMARK OFFICE
CERTIFICATE OF CORRECTION

PATENT NO. : 6,025,967
DATED : Feb. 15, 2000
INVENTOR(S) : Kuta et al.

It is certified that error appears in the above-identified patent and that said Letters Patent are hereby corrected as shown below:

Column 9, line 41, "may tape drive" should read --magnetic tape drive--.

Signed and Sealed this

Eighth Day of May, 2001

Attest:

NICHOLAS P. GODICI

Attesting Officer        Acting Director of the United States Patent and Trademark Office